United States Patent [19]
Yamamoto et al.

[11] Patent Number: 5,269,844
[45] Date of Patent: Dec. 14, 1993

[54] COLORED PASTE
[75] Inventors: Shigeyuki Yamamoto; Hiroshi Adachi, both of Amagasaki, Japan
[73] Assignee: Mitsubishi Denki Kabushiki Kaisha, Tokyo, Japan
[21] Appl. No.: 703,102
[22] Filed: Dec. 10, 1992

Related U.S. Application Data

[63] Continuation of Ser. No. 709,296, Jun. 3, 1991, abandoned.

[30] Foreign Application Priority Data

Jul. 30, 1990 [JP] Japan ................. 2-204125

[51] Int. Cl.$^5$ ............................ C04B 14/04
[52] U.S. Cl. .......................... 106/490; 106/2; 106/181.12; 106/287.1; 106/287.16; 106/806; 524/828; 524/858; 528/10
[58] Field of Search ............... 524/828, 858; 106/287.16, 2, 181.12, 806, 287.1, 490; 528/10

[56] References Cited

U.S. PATENT DOCUMENTS 3,175,994  3/1965  Katchman et al. ............... 524/858
4,427,824  1/1984  Kato et al. ...................... 524/858
4,952,617  8/1990  Ayala et al. ..................... 523/200

FOREIGN PATENT DOCUMENTS 58-46325   3/1983  Japan.
60-184202  9/1985  Japan.
61-254906 11/1986  Japan.
1-96265    4/1989  Japan ........................ 106/287.16
90/00581   1/1990  PCT Int'l Appl.

OTHER PUBLICATIONS

Translation of JP 1-96265, PTO 91-4975, Apr. 1989.

Primary Examiner—Karl Group
Assistant Examiner—Scott L. Hertzog
Attorney, Agent, or Firm—Burns, Doane, Swecker & Mathis

[57] ABSTRACT

A colored paste composed of a silicone ladder polymer, a solvent, and an organic pigment insoluble in said solvent, said silicone ladder polymer being a polymer having an average molecular weight of $1.0 \times 10^3$ to $3.5 \times 10^5$. The colored paste has good storage stability and readily forms a uniform film by spin coating.

13 Claims, No Drawings

COLORED PASTE

This application is a continuation, of application Ser. No. 07/709,296, filed Jun. 3, 1991 now abandoned.

BACKGROUND OF THE INVENTION

1. Field of the Invention

The present invention relates to a colored paste.

2. Description of the Prior Art

There is a known colored paste which is formed by mixing a heat-resistant polyimide resin precursor with a pigment, as disclosed in Japanese Patent Laid-open No. 46325/1983.

The conventional colored paste derived from a polyimide precursor has a disadvantage of being poor in storage stability and also in application properties for uniform spin coating because of its excessive thixotropy ascribed to the coiled molecular structure.

SUMMARY of the INVENTION

The present invention was completed to address the above-mentioned problem. Accordingly, it is an object of the present invention to provide a colored paste which is superior in storage stability and application properties for uniform coating.

The present invention is embodied in a colored paste which comprises a silicone ladder polymer, a solvent, and an organic pigment insoluble in said solvent, said silicone ladder polymer being a polymer having an average molecular weight of $1.0 \times 10^3$ to $3.5 \times 10^5$ represented by the formula (I) below:

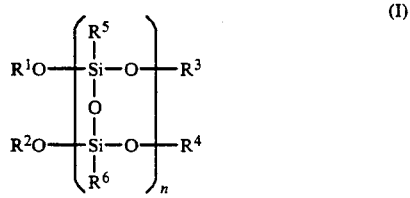

(where $R^1$ to $R^4$ each denotes a hydrogen atom or lower alkyl group, $R^5$ and $R^6$ each denotes an aryl group, alkenyl group, or alkyl group, as many $R^5$ and $R^6$ as n may be the same or different from one another, and n is an integer of 5 to 1600.) and said organic pigment being mixed in a ratio of 5 to 400 parts by weight to 100 parts by weight of said polymer.

DESCRIPTION OF THE PREFERRED EMBODIMENTS

The colored paste of the present invention contains a silicone ladder polymer having an average molecular weight of $1.0 \times 10^3$ to $3.5 \times 10^5$ represented by the formula (I) below:

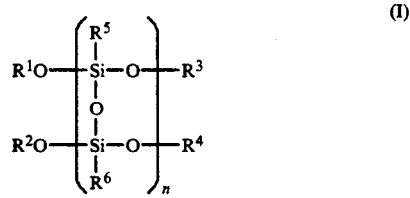

(where $R^1$ to $R^4$ each denotes a hydrogen atom or lower alkyl group, $R^5$ and $R^6$ each denotes an aryl group, alkenyl group, or alkyl group, as many $R^5$ and $R^6$ as n may be the same or different from one another, and n is an integer of 5 to 1600.)

Having the siloxane skeleton of ladder structure, this polymer is rigid and has good heat resistance and low thixotropy. In addition, owing to the siloxane skeleton in the molecular structure, this polymer has a transmission higher than 90% for visible light in the region of wavelength longer than 400 nm. Moreover, this silicone ladder polymer is chemically stable and takes on the ladder structure when it is in the form of solution. Therefore, the colored pasted made with this polymer is superior in storage stability.

The colored paste of the present invention contains as the base polymer a silicone ladder polymer represented by the formula (I) below.

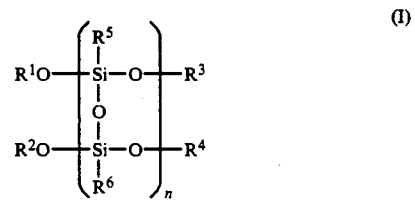

In Formula (I), $R^1$ to $R^4$ each denotes a hydrogen atom or lower alkyl group. Examples of the lower alkyl group include methyl group, ethyl group, and propyl group. $R^5$ and $R^6$ each denotes an aryl group (such as phenyl group), alkenyl group (such as vinyl group and allyl group), or alkyl group (such as methyl group and ethyl group). As many $R^5$ and $R^6$ as n may be the same or different from one another. The subscript "n" is an integer of 5 to 1600, preferably 50–1000. With the value of n smaller than 5, the colored paste is poor in film-forming properties. With the value of n greater than 1600, the colored paste is poor in solubility.

According to the present invention, the silicone ladder polymer should have an average molecular weight of $1.0 \times 10^3$ to $3.5 \times 10^5$, preferably $1.0 \times 10^4$ to $2.0 \times 10^5$.

Examples of the silicone ladder polymer include polyphenylsilsesquioxane, polymethylphenylsilsesquioxane, polyethylphenylsilsesquioxane, polyphenylvinylsilsesquioxane, polymethylvinylsilsesquioxane, and polyethylvinylsilsesquioxane.

In this connection, the silicone ladder polymer shown by Formula (I) may be obtained by following the procedure disclosed in Japanese Patent Application No. 2868/1990; for example, water drops are dropped into an organic solvent solution of phenyltrichlorosilane and an unsaturated functional group containing trichlorosilane for hydrolysis and the hydrolysis products are washed by water and subjected to heating under nucleophilic reagents and then to dehydration-condensation reaction to obtain said silicone ladder polymer.

The colored paste of the present invention contains a solvent in which the above-mentioned polymer is dissolved and the organic pigment mentioned later is dispersed. Examples of the solvent include aromatic hydrocarbons (such as anisole and xylene), ketones (such as methyl isobutyl ketone and acetone), ethers (such as tetrahydrofuran and isopropyl ether), N-methyl-2-pyrrolidone, and N,N-dimethylacetamide. (These solvents are desirable from the standpoint of dissolution of the silicone ladder polymer.) Other examples of the solvent include aromatic hydrocarbons (such as anisole, xylene, and benzene), ketones (such as methyl isobutyl ketone and acetone), ethers (such as tetrahydrofuran and diethyl ether), ethyl cellosolve, N-methyl-2-pyrrolidone, and N,N-dimethylacetamide. (These solvents are desirable from the standpoint of dispersion of the pigment.) These solvents may be used alone or in combination with one another.

There are no restrictions on the amount of the solvent to be used. It should preferably be used in an amount of 2 to 20 parts by weight for 1 part by weight of the silicone ladder polymer so that it readily solubilizes the silicone ladder polymer and the resulting colored paste has good storage stability and application properties for uniform coating.

The colored paste of the present invention contains an organic pigment which is insoluble in the above-mentioned solvent. The pigment should take on any one of the three primary colors (red, green, and blue). In addition, it should have good heat resistance so that it does not undergo decomposition, foaming, and noticeable discoloration when the colored paste is applied to a substrate and heated at 300° C. for 10 minutes.

The pigment should have a particle diameter smaller than 1 μm; otherwise, the resulting colored paste is poor in film-forming properties. Examples of the pigment include quinacridone pigments (such as Color Index No. 73905 pigment red 209 and Color Index No. 46500 pigment violet 19) which take on a red color, phthalocyanine green pigments (such as Color Index No. 74160 pigment green 36 and Color Index No. 74260 pigment green 7) which take on a green color, and phthalocyanine blue pigments (such as Color Index No. 74160 pigment blue 15-3 and Color Index No. 74160 pigment blue 15-4) which take on a blue color.

The organic pigment should be added in an amount of 5-400 parts by weight, preferably 10-300 parts by weight, for 100 pars by weight of the silicone ladder polymer. With an amount less than 5 parts by weight, the pigment does not produce the desired effect of the colored paste. With an amount in excess of 400 parts by weight, the pigment does not disperse uniformly in the colored paste, impairing the application properties and film-forming properties.

The colored paste of the present invention may be optionally incorporated with a small amount of surface active agent and other additives within the ranges which do not adversely affect the performance and heat resistance of the colored paste.

The colored paste of the present invention may be prepared by dissolving the silicone ladder polymer in the solvent and mixing the solution with the organic pigment with stirring for thorough dispersion. The order of dissolution and mixing is not specifically limited. It is possible to mix the pigment with the solvent and then dissolve the silicone ladder polymer in the solvent.

The colored paste of the present invention contains the pigment in the completely dispersed state, has good application properties for uniform coating with very little thixotropy, and is superior in storage stability.

The present invention will be described with reference to the following examples, which are not intended to restrict the scope of the invention.

EXAMPLES 1 to 6

In a 300-ml flask was placed a solvent as shown in Table 1. In the solvent was completely dissolved a silicone ladder polymer as shown in Table 1 with stirring. To the solution was added an organic pigment as shown in Table 1 with stirring for thorough dispersion. Thus there was obtained a desired colored paste.

The colored paste was applied to a glass plate (4 inches) using a spinner so that the amount of coating was about 2 ml. The coating step was followed by heating at 100° C., 200° C., and 300° C. for 30 minutes each.

The coating film was tested for thickness and surface roughness at the center of the glass substrate and several points 0.5 cm, 1.0 cm, 2.0 cm, and 4.0 cm away from the center, using a surface texture measuring apparatus (Dektak 3030, made by Throne Co., Ltd.). The same experiment as mentioned above was repeated for a colored paste which had been aged at 25°-40° C. for 1 month. The results are shown in Table 2. It is noted that the colored pastes in these examples meet the desired requirements.

COMPARATIVE EXAMPLES 1 to 3

Colored pastes were prepared in the same manner as in Examples 1 to 6 except that changes were made in the kind and amount of the solvent, silicone ladder polymer, and organic pigment as shown in Table 1. The coating film of the colored pastes were examined for thickness and surface roughness. The results are shown in Table 2.

In Comparative Example 1, the colored paste was poor in film-forming properties because the silicone ladder polymer had too low an average molecular weight (or a degree of polymerization (n) smaller than 5). In addition, the colored paste gave a coating film which cracked upon heating.

In Comparative Example 2, the colored paste was not homogeneous because the silicone ladder polymer did not dissolve completely in the solvent because it had too high an average molecular weight (or a degree of polymerization (n) greater than 1600).

In Comparative Example 3, the colored paste was poor in film-forming properties and gave a coating film with a rough surface because it was incorporated with an excess amount of the organic pigment which was not uniformly dispersed.

TABLE 1

| Example No. | Solvent Name[1] | (g) | Silicone ladder polymer Side functional groups ($R^5$, $R^6$) | Terminal functional groups ($R^1$-$R^4$) | Ave. mol. weight (Mw) | (g) | Organic pigment Name | (g) |
|---|---|---|---|---|---|---|---|---|
| 1 | Anisole | 100 | Ph | H | $1.05 \times 10^5$ | 30 | C.I. 73905 Pigment Red 209[5] | 10 |
| 2 | Methyl iosobutyl ketone | 100 | Ph:$CH_3$ = 9:1 | $C_2H_5$ | $7.50 \times 10^4$ | 20 | C.I. 73905 Pigment Red 209 | 5 |
| 3 | Toluene | 100 | Ph:—CH=$CH_2$ = 95:5 | $CH_3$ | $1.93 \times 10^5$ | 45 | C.I. 74260 Pigment Green 7[6] | 40 |
| 4 | NMP[2]:DMAc[3] = 1:1 | 100 | Ph:—$CH_2CH_3$ = 7:3 | H | $6.32 \times 10^4$ | 25 | C.I. 74260 Pigment Green 7 | 50 |
| 5 | NMP:toluene = 1:1 | 100 | Ph:—CH=$CH_2$ = 9:1 | $CH_3$ | $2.37 \times 10^5$ | 35 | C.I. 74160 | 25 |

TABLE 1-continued

| Example No. | Solvent Name[1] | (g) | Silicone ladder polymer Side functional groups ($R^5$, $R^6$) | Terminal functional groups ($R^1$-$R^4$) | Ave. mol. weight (Mw) | (g) | Organic pigment Name | (g) |
|---|---|---|---|---|---|---|---|---|
| 6 | Anisole:DMAc = 1:1 | 100 | Ph:—CH=$CH_2$ = 95:5 | $CH_3$ | $2.98 \times 10^5$ | 40 | Pigment Blue 15-3[7] C.I. 74160 | 20 |
| (1) | Anisole | 100 | Ph | H | $3.20 \times 10^2$ | 30 | Pigment Blue 15-3 C.I. 73905 | 30 |
| (2) | Toluene | 100 | Ph:$CH_3$ = 9:1 | $C_2H_5$ | $5.17 \times 10^6$ | 25 | Pigment Red 209 C.I. 73905 | 20 |
| (3) | NMP:DMAc = 1:1 | 100 | Ph:—CH=$CH_2$ = 7:3 | $CH_3$ | $3.98 \times 10^4$ | 35 | Pigment Red 209 C.I. 74260 Pigment Green 7 | 180 |

Comparative Examples are indicated by parenthesized numbers.
Note to Table 1
[1] The ratio of two solvents is expressed in volume.
[2] N-methyl-2-pyrrolidone
[3] N,N-dimethylacetamide
[4] The ratio of two groups is expressed in mole.
[5] Quinacridone
[6] Phthalocyanine green
[7] Phthalocyanine blue

TABLE 2

Film Thickness (μm) and Surface Roughness (μm) at Different Sampling Points

| Example No. | Distance (mm) of sampling points from the center (Experiment with a fresh colored paste) | | | | | | Ageing temp. (°C.) | Distance (mm) of sampling points from the center (Experiment with a colored pigment aged for 1 month) | | | | | |
|---|---|---|---|---|---|---|---|---|---|---|---|---|---|
| | 0 | 5 | 10 | 20 | 30 | 40 | | 0 | 5 | 10 | 20 | 30 | 40 |
| 1 | 1.97 (0.006) | 1.93 (0.006) | 1.92 (0.010) | 1.92 (0.010) | 1.91 (0.012) | 1.91 (0.012) | 25 | 1.96 (0.006) | 1.94 (0.006) | 1.92 (0.009) | 1.92 (0.012) | 1.92 (0.012) | 1.91 (0.13) |
| 2 | 1.73 (0.009) | 1.68 (0.010) | 1.67 (0.010) | 1.65 (0.013) | 1.65 (0.015) | 1.65 (0.015) | 35 | 1.73 (0.010) | 1.69 (0.011) | 1.65 (0.012) | 1.64 (0.012) | 1.64 (0.014) | 1.62 (0.016) |
| 3 | 1.43 (0.015) | 1.42 (0.015) | 1.42 (0.018) | 1.42 (0.019) | 1.41 (0.019) | 1.40 (0.022) | 40 | 1.42 (0.015) | 1.41 (0.017) | 1.40 (0.019) | 1.40 (0.019) | 1.41 (0.020) | 1.40 (0.022) |
| 4 | 1.31 (0.010) | 1.30 (0.012) | 1.30 (0.014) | 1.28 (0.014) | 1.28 (0.015) | 1.27 (0.015) | 30 | 1.32 (0.009) | 1.31 (0.011) | 1.30 (0.015) | 1.28 (0.016) | 1.27 (0.016) | 1.26 (0.017) |
| 5 | 1.61 (0.017) | 1.58 (0.019) | 1.56 (0.020) | 1.55 (0.021) | 1.54 (0.021) | 1.52 (0.023) | 25 | 1.62 (0.017) | 1.60 (0.020) | 1.60 (0.021) | 1.57 (0.023) | 1.55 (0.023) | 1.54 (0.025) |
| 6 | 1.76 (0.018) | 1.73 (0.018) | 1.73 (0.021) | 1.71 (0.023) | 1.70 (0.024) | 1.69 (0.024) | 35 | 1.75 (0.019) | 1.72 (0.020) | 1.71 (0.021) | 1.71 (0.023) | 1.69 (0.025) | 1.68 (0.025) |
| (1) | — | — | — | — | — | — | — | — | — | — | — | — | — |
| (2) | — | — | — | — | — | — | — | — | — | — | — | — | — |
| (3) | 1.73 (0.054) | 1.72 (0.089) | 1.70 (0.103) | 1.70 (0.159) | 1.69 (0.192) | 1.69 (0.226) | 25 | 1.70 (0.064) | 1.67 (0.093) | 1.65 (0.126) | 1.65 (0.173) | 1.63 (0.221) | 1.60 (0.256) |

Comparative Examples are indicated by parenthesized numbers.

Effect of the Invention

The present invention provides a colored paste composed of an organic solvent, a silicone ladder polymer having good heat resistance and transparency, and an organic pigment having good heat resistance. The colored paste takes on a red color, green color, or blue color according to the pigment used. The colored paste has good storage stability and readily forms a uniform film by spin coating.

What is claimed is:

1. A colored paste which comprises a silicone ladder polymer, a solvent, and an organic pigment insoluble in said solvent and having a particle diameter smaller than 1 μm, said silicone ladder polymer being a polymer having an average molecular weight of $1.0 \times 10^3$ to $3.5 \times 10^5$ represented by the formula (I) below:

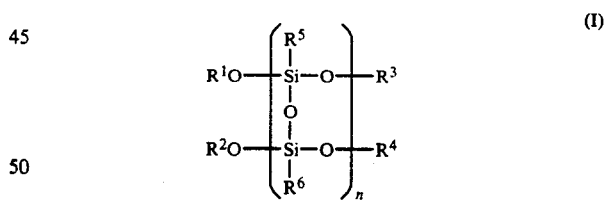

where $R^1$ to $R^4$ each denotes a hydrogen atom or lower alkyl group, $R^5$ and $R^6$ each denotes an aryl group, alkenyl group, or alkyl group, wherein $R^5$ and $R^6$ may be the same or different from one another, and may vary between the repeat units, and n is an integer of 5 to 1600;
and wherein said organic pigment is mixed in a ratio of 5 to 400 parts by weight to 100 parts by weight of said polymer.

2. A colored paste according to claim 1, wherein said lower alkyl group includes a member selected from the group consisting of methyl group, ethyl group, and propyl group.

3. A colored paste according to claim 1, wherein said aryl group includes a phenyl group, said alkenyl group includes a member selected from the group consisting of vinyl group and allyl group, and said alkyl group includes a member selected from the group consisting of methyl group and ethyl group.

4. A colored paste according to claim 1, wherein said n is an integer of 50 to 1,000.

5. A colored paste according to claim 1, wherein said silicone ladder polymer is a polymer having an average molecular weight of $1.0 \times 10^4$ to $2.0 \times 10^5$.

6. A colored paste according to claim 1, wherein said solvent is used in an amount of 2 to 20 parts by weight for 1 part by weight of the silicone ladder polymer.

7. A colored paste according to claim 1, wherein said pigment is mixed in a ratio of 10-300 parts by weight to 100 parts by weight of the silicone ladder polymer.

8. The colored paste of claim 1 wherein the solvent is anisole, $R^5$ and $R^6$ are phenyl, $R^1$ to $R^4$ are hydrogen, and which comprises 100 parts by weight of anisole, 30 parts by weight of the silicone polymer and 10 parts by weight of the organic pigment.

9. The colored paste of claim 1 wherein the solvent is methyl isobutyl ketone, $R^5$ and $R^6$ are respectively phenyl and methyl and are comprised in a 9:1 ratio, $R_1$ to $R_4$ are each ethyl, and which comprises 100 parts by weight of methyl isobutyl ketone, 20 parts by weight of the silicone polymer and 5 parts by weight of an organic pigment.

10. The colored paste of claim 1 wherein the solvent is toluene, $R^5$ and $R^6$ are respectively phenyl and ethylene and are comprised in a 95:5 ratio, $R^1$—$R^4$ are methyl, which comprises 100 parts by weight of toluene, 45 parts by weight of silicone polymer and 40 parts by weight of an organic pigment.

11. The colored paste of claim 1 wherein the solvent comprises a 1:1 weight ratio of NMP:DMAc, $R^5$ and $R^6$ are respectively phenyl and ethyl and are comprised in a 7:3 ratio, $R^1$—$R^4$ comprise hydrogen, which comprises 100 parts by weight of said solvent, 25 parts by weight of the silicone ladder polymer and 50 parts by weight of an organic pigment.

12. The colored paste of claim 1 wherein the solvent comprises a 1:1 ratio of NMP:toluene, $R^5$ and $R^6$ respectively comprise phenyl and ethylene and are comprised in a 9:1 ratio, $R^1$—$R^4$ are each methyl, which comprises 100 parts by weight of said solvent, 35 parts by weight of the silicone ladder polymer and 25 parts by weight of an organic pigment.

13. The colored paste of claim 1 wherein the solvent comprises a 1:1 ratio of anisole: DMAc, $R^5$ and $R^6$ are respectively phenyl and ethylene and are comprised at a 95:5 ratio, $R^1$—$R^4$ are each methyl, which comprises 100 parts by weight of said solvent, 40 parts by weight of the silicone ladder polymer and 20 parts by weight of an organic pigment.

* * * * *

UNITED STATES PATENT AND TRADEMARK OFFICE
CERTIFICATE OF CORRECTION

PATENT NO. : 5,269,844
DATED : December 14, 1993
INVENTOR(S) : Shigeyuki YAMAMOTO et al It is certified that error appears in the above-indentified patent and that said Letters Patent is hereby corrected as shown below:

On the title page:

In Section [21], delete "703,102" and insert -- 988,802 --.

Signed and Sealed this

Third Day of May, 1994

Attest:

BRUCE LEHMAN

Attesting Officer     Commissioner of Patents and Trademarks